United States Patent
Park et al.

(10) Patent No.: US 10,941,291 B2
(45) Date of Patent: *Mar. 9, 2021

(54) POLYALKYLENE CARBONATE RESIN COMPOSITION AND POLYALKYLENE CARBONATE RESIN MOLDED ARTICLE

(71) Applicant: LG CHEM, LTD., Daejeon (KR)

(72) Inventors: Seung Young Park, Daejeon (KR); Sung-Kyoung Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 9 days.

This patent is subject to a terminal disclaimer.

(21) Appl. No.: 16/465,976

(22) PCT Filed: Dec. 27, 2017

(86) PCT No.: PCT/KR2017/015577
§ 371 (c)(1),
(2) Date: May 31, 2019

(87) PCT Pub. No.: WO2018/124743
PCT Pub. Date: Jul. 5, 2018

(65) Prior Publication Data
US 2019/0300702 A1  Oct. 3, 2019

(30) Foreign Application Priority Data

Dec. 27, 2016  (KR) .................. 10-2016-0180049
Dec. 26, 2017  (KR) .................. 10-2017-0180257

(51) Int. Cl.
*C08L 69/00* (2006.01)
*C08G 64/02* (2006.01)
*C08L 61/02* (2006.01)
*C08L 67/04* (2006.01)
*C08L 73/00* (2006.01)

(52) U.S. Cl.
CPC .............. *C08L 69/00* (2013.01); *C08G 64/02* (2013.01); *C08L 61/02* (2013.01); *C08L 67/04* (2013.01); *C08L 73/00* (2013.01)

(58) Field of Classification Search
CPC ....... C08L 65/00; C08L 69/00; C08L 2205/03; C08G 64/0208
See application file for complete search history.

(56) References Cited

U.S. PATENT DOCUMENTS

| 4,880,908 | A | * | 11/1989 | Lutz | .............. C08L 73/00 525/468 |
| H1601 | H | * | 10/1996 | Machado | ................ 525/421 |
| 5,792,530 | A | | 8/1998 | Bonner et al. | |
| 5,973,048 | A | | 10/1999 | Van Helmond et al. | |
| 2003/0013821 | A1 | * | 1/2003 | Tan | ............... D04H 1/4382 525/413 |
| 2008/0274360 | A1 | * | 11/2008 | Gallucci | ................ C08L 71/00 428/412 |
| 2009/0065730 | A1 | * | 3/2009 | Yoshino | ................ C08L 71/02 252/62.2 |
| 2009/0236565 | A1 | * | 9/2009 | Mercx | ................ C08L 101/10 252/511 |
| 2011/0178196 | A1 | * | 7/2011 | Steinke | ................ C08L 69/00 521/135 |
| 2012/0165479 | A1 | | 6/2012 | Hong et al. | |
| 2013/0066015 | A1 | | 3/2013 | Lee et al. | |
| 2014/0378624 | A1 | | 12/2014 | Hong et al. | |
| 2018/0305542 | A1 | | 10/2018 | Lee et al. | |
| 2020/0010676 | A1 | | 1/2020 | Park et al. | |
| 2020/0056003 | A1 | | 2/2020 | Kim et al. | |

FOREIGN PATENT DOCUMENTS

| EP | 1264860 A1 | 12/2002 |
| JP | 07216215 A | 8/1995 |
| JP | 09118820 A | 5/1997 |
| JP | 10-1601 A | 1/1998 |
| JP | 2007-131756 * | 5/2007 |
| JP | 2007131756 A | 5/2007 |
| JP | 2018-531314 A | 10/2018 |
| JP | 2019-521239 A | 7/2019 |
| JP | 2019-531381 A | 10/2019 |
| KR | 1020100016205 A | 2/2010 |
| KR | 101293916 B1 | 8/2013 |
| KR | 101401925 B1 | 6/2014 |
| KR | 101466911 B1 | 12/2014 |
| KR | 1020150029367 A | 3/2015 |
| KR | 1020160059900 A | 5/2016 |
| KR | 1020170062561 A | 6/2017 |
| KR | 1020180076351 A | 7/2018 |
| WO | WO-2016072642 A2 * | 5/2016 ............. B29C 45/00 |

OTHER PUBLICATIONS

Translation of WO 2016/072642 (2016) (Year: 2016).*
Translation of JP2007-131756 (2007) (Year: 2007).*
Inoue, et al., Polymer Letters, 1969, vol. 7, No. 4. pp. 287-292.
Murat Acemoglu, et al., Journal of Controlled release 1997, vol. 49, pp. 263-276.
Polymer Materials Science and Engineering, 2010, vol. 26, No. 3, pp. 142-145.

\* cited by examiner

*Primary Examiner* — Robert C Boyle
(74) *Attorney, Agent, or Firm* — Dentons US LLP

(57) ABSTRACT

The disclosed relates to a polyalkylene carbonate resin composition, and more specifically, to a polyalkylene carbonate resin composition containing polyalkylene carbonate and polyketone. The polyalkylene carbonate resin composition particularly exhibits excellent thermal stability, while having excellent transparency and flexibility, oxygen barrier properties, and mechanical and chemical properties.

10 Claims, 1 Drawing Sheet

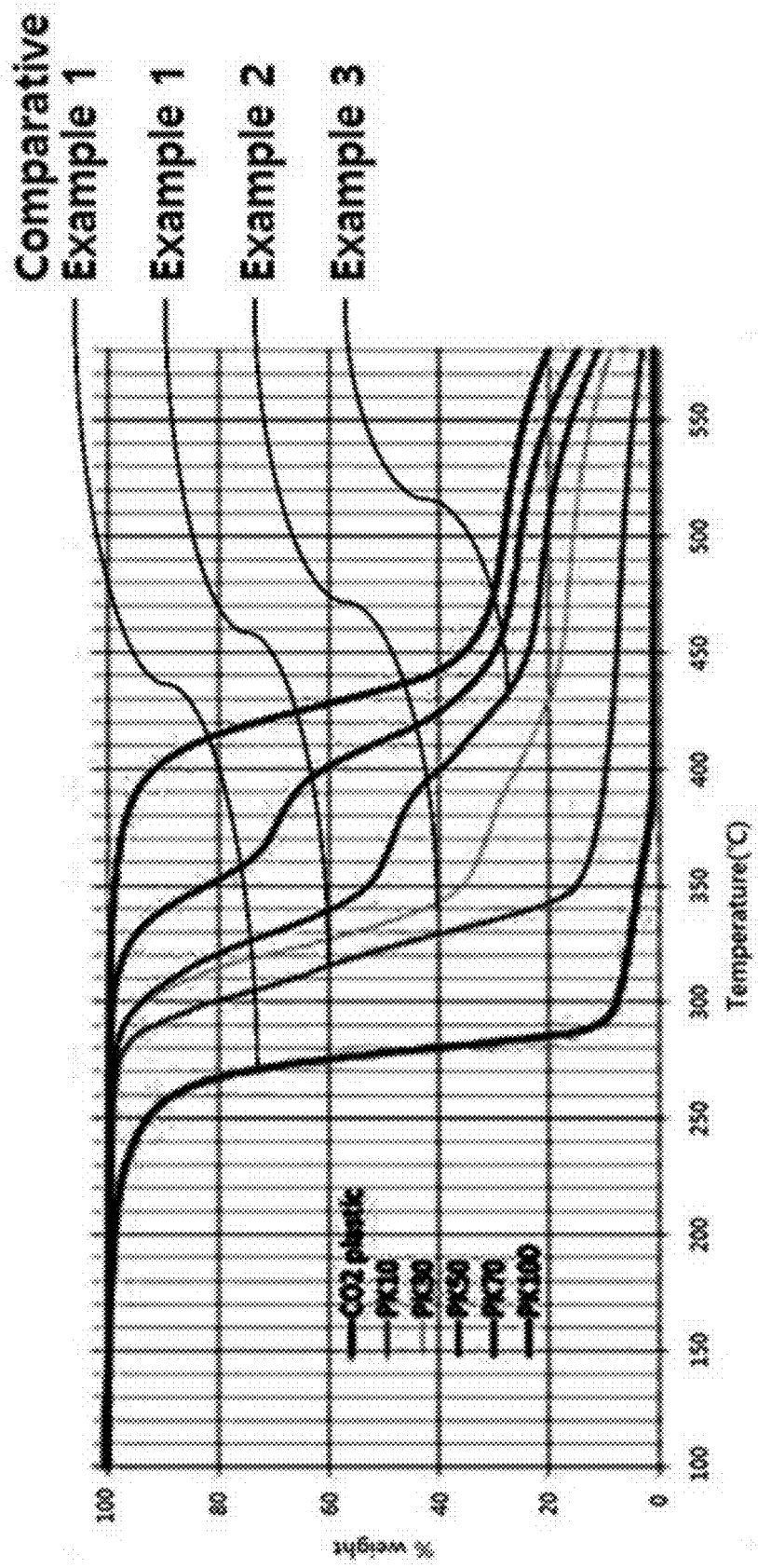

POLYALKYLENE CARBONATE RESIN COMPOSITION AND POLYALKYLENE CARBONATE RESIN MOLDED ARTICLE

CROSS-REFERENCE TO RELATED APPLICATION(S)

This application is a National Stage Application of International Application No. PCT/KR2017/015577, filed on Dec. 27, 2017, which claims priority to and the benefits of Korean Patent Application Nos. 10-2016-0180049, filed on Dec. 27, 2016, and 10-2017-0180257, filed on Dec. 26, 2017, with the Korean Intellectual Property Office, the disclosures of which are incorporated herein by reference in their entireties.

TECHNICAL FIELD

The present invention relates to a polyalkylene carbonate resin composition, and more specifically, to a polyalkylene carbonate resin composition containing polyalkylene carbonate and polyketone and exhibiting excellent thermal stability while having excellent transparency, flexibility, oxygen barrier properties, and mechanical and chemical properties.

BACKGROUND ART

A polyalkylene carbonate is a non-crystalline transparent resin and has characteristics such as excellent transparency, excellent flexibility, and a high oxygen barrier property. Also, unlike an aromatic polycarbonate, which is a similar type of engineering plastic, the polyalkylene carbonate has an advantage in that it exhibits biodegradability, is completely decomposed into carbon dioxide and water during combustion, and has no carbon residue.

However, the polyalkylene carbonate has drawbacks in that, when processed into pellets, films, or sheets, a blocking phenomenon between resins or products appears due to self-adhesiveness, handling is not easy, thermal stability is low, and processing conditions are very strict.

In this regard, attempts have been made to mix and use other kinds of resins capable of improving the physical properties of the polyalkylene carbonate, for example, polylactide.

However, in the previously known resin composition including the polyalkylene carbonate and polylactide, there is a limitation in that offsetting of the physical properties is largely exhibited, for example, the inherent physical properties of the polyalkylene carbonate sharply decrease as the content of the polylactide increases, and the effect of improving the physical properties such as thermal stability at a high temperature is also insufficient.

DETAILED DESCRIPTION OF THE INVENTION

Technical Problem

It is an object of the present invention to provide a resin composition which has excellent thermal stability while maintaining inherent physical properties of polyalkylene carbonate and thus can be used for various applications.

Technical Solution

The present invention provides a polyalkylene carbonate resin composition including 1 to 100 parts by weight of polyketone based on 100 parts by weight of polyalkylene carbonate.

The polyalkylene carbonate may include a repeating unit represented by the following Chemical Formula 1.

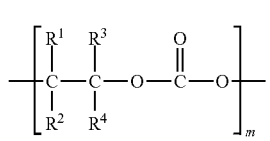

[Chemical Formula 1]

In Chemical Formula 1,
$R^1$ to $R^4$ are each independently hydrogen, a linear or branched alkyl group having 1 to 20 carbon atoms, an aryl group having 6 to 20 carbon atoms, an alkenyl group having 1 to 20 carbon atoms, or a cycloalkyl group having 3 to 20 carbon atoms, at least two of $R^1$ to $R^4$ may be connected to each other to form a cycloalkyl group having 3 to 10 carbon atoms, and m is an integer of 10 to 1000.

Specifically, the polyalkylene carbonate may be at least one selected from the group consisting of polyethylene carbonate, polypropylene carbonate, polypentene carbonate, polyhexene carbonate, polyoctene carbonate, polycyclohexene carbonate resin, and a copolymer resin thereof.

In addition, the polyalkylene carbonate may have a weight average molecular weight of about 10,000 g/mol to 1,000,000 g/mol.

Further, the polyketone may include a repeating unit represented by the following Chemical Formula 2.

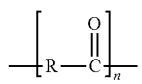

[Chemical Formula 2]

In Chemical Formula 2,
R is a linear or branched alkylene having 1 to 10 carbon atoms, an arylene having 1 to 10 carbon atoms, an alkyl ether having 1 to 10 carbon atoms, an aryl ether having 1 to 10 carbon atoms, an alkyl ester having 1 to 10 carbon atoms, or an aryl ester having 1 to 10 carbon atoms, and n is an integer of 10 to 1000.

More specifically, the polyketone may be an aliphatic polyketone containing ethylene, propylene, isopropylene, or butylene units.

Further, the polyketone may be a binary copolymer or a ternary copolymer containing at least two of the above-mentioned repeating units.

According to one embodiment of the invention, the polyketone may preferably have a weight average molecular weight of about 10,000 to 1,000,000 g/mol.

According to another embodiment of the invention, the polyalkylene carbonate resin composition may further include about 1 to about 30 parts by weight of polylactide based on 100 parts by weight of the polyalkylene carbonate.

Due to such a composition, the polyalkylene carbonate resin composition of the present invention may have a rate of mass loss due to thermal decomposition at about 250° C. of about 10% or less, when measuring the rate of mass loss due to a temperature change.

In addition, the present invention provides a polyalkylene carbonate resin molded article which is produced using the above-described polyalkylene carbonate resin composition.

Advantageous Effects

The polyalkylene carbonate resin composition according to the present invention has excellent thermal stability while maintaining inherent physical properties of polyalkylene carbonate, and thus is excellent in processability at a high temperature and can be used for various applications.

BRIEF DESCRIPTION OF DRAWINGS

The Drawing is a graph showing TGA analysis results of the resin compositions according to examples and comparative examples of the present invention.

DETAILED DESCRIPTION OF THE EMBODIMENTS

The polyalkylene carbonate resin composition of the present invention includes 1 to 100 parts by weight of polyketone based on 100 parts by weight of polyalkylene carbonate.

In addition, the polyalkylene carbonate resin molded article of the present invention is produced using the above-described polyalkylene carbonate resin composition.

The terms "first," "second," etc. may be used herein to describe various components, and these terms are used only for distinguishing one element from others.

Further, terms used herein are used only to describe particular embodiments only and are not intended to be limiting of the invention. As used herein, singular expressions "a," "an," and "the" are intended to include plural expressions as well, unless the context clearly indicates otherwise. Also, throughout the specification, it should be understood that the terms "comprise," "include", "have", etc. are used to specify the presence of stated features, numbers, steps, components, or combinations thereof, but do not preclude the presence or addition of one or more other features, numbers, steps, components, or combinations thereof.

Since the embodiments of the present invention are susceptible to various modifications and alternative forms, specific embodiments thereof will be illustrated and described in detail below. It should be understood, however, that the present invention is not limited to the particular embodiments disclosed, but on the contrary, the invention is to cover all modifications, equivalents, and alternatives falling within the spirit and scope of the invention.

Hereinafter, the polyalkylene carbonate resin composition and the polyalkylene carbonate resin molded article according to the present invention will be described in detail.

The polyalkylene carbonate resin composition according to one aspect of the present invention includes 1 to 100 parts by weight of polyketone based on 100 parts by weight of polyalkylene carbonate.

The polyalkylene carbonate may include at least one repeating unit represented by the following Chemical Formula 1.

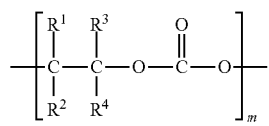

[Chemical Formula 1]

In Chemical Formula 1, $R^1$ to $R^4$ are each independently hydrogen, a linear or branched alkyl group having 1 to 20 carbon atoms, an aryl group having 6 to 20 carbon atoms, an alkenyl group having 1 to 20 carbon atoms, or a cycloalkyl group having 3 to 20 carbon atoms, at least two of $R^1$ to $R^4$ may be connected to each other to form a cycloalkyl group having 3 to 10 carbon atoms, and m is an integer of 10 to 1000.

Specifically, the polyalkylene carbonate may be at least one selected from the group consisting of polyethylene carbonate, polypropylene carbonate, polypentene carbonate, polyhexene carbonate, polyoctene carbonate, a polycyclohexene carbonate resin, and a copolymer resin thereof.

Further, the polyalkylene carbonate may have a weight average molecular weight of about 10,000 to about 1,000,000 g/mol, preferably about 50,000 to about 500,000 g/mol.

The polyalkylene carbonate is a non-crystalline polymer including a repeating unit represented by Chemical Formula 1.

Further, the polyalkylene carbonate may have a relatively low glass transition temperature (Tg) of about 40° C. or less, for example, about 10° C. to about 40° C., and can be adjusted within this range.

The method for preparing the polyalkylene carbonate is not particularly limited, and for example, the polyalkylene carbonate can be obtained by copolymerizing an epoxide-based compound with carbon dioxide. Alternatively, the polyalkylene carbonate can be obtained by ring-opening polymerization of a cyclic carbonate. The copolymerization of the alkylene oxide and carbon dioxide may be carried out in the presence of a metal complex compound such as zinc, aluminum, or cobalt.

When a polyalkylene carbonate is prepared through copolymerization using an epoxide-based compound and carbon dioxide in the presence of an organic metallic catalyst, the epoxide-based compound may be ethylene oxide, propylene oxide, 1-butene oxide, 2-butene oxide, isobutylene oxide, 1-pentene oxide, 2-pentene oxide, 1-hexene oxide, 1-octene oxide, cyclopentene oxide, cyclohexene oxide, styrene oxide, butadiene monoxide, or the like, or alternatively two or more kinds of various epoxide-based compounds selected among them, but the present invention is not limited thereto.

The polyalkylene carbonate may be a homopolymer containing a repeating unit represented by Chemical Formula 1, a copolymer containing two or more kinds of repeating units belonging to the category of Chemical Formula 1, or a copolymer containing an alkylene oxide repeating unit or the like together with the repeating unit represented by Chemical Formula 1.

However, in order to maintain specific physical properties (for example, biodegradability, elongation, flexibility, low glass transition temperature, etc.) caused by the repeating unit represented by Chemical Formula 1, the polyalkylene carbonate may be a copolymer containing at least one of the repeating units represented by Chemical Formula 1 in an amount of at least about 40% by weight, preferably at least about 60% by weight, and more preferably at least about 80% by weight.

According to one embodiment of the present invention, the polyalkylene carbonate may be, for example, polyethylene carbonate, polypropylene carbonate, polypentene carbonate, polyhexene carbonate, polyoctene carbonate, polycyclohexene carbonate, or a copolymer resin thereof, but the present invention is not limited thereto. The $R^1$ to $R^4$ may be selected as appropriate functional groups in consideration of physical properties of the resin to be finally obtained and blended with the polyketone.

For example, when the functional group is hydrogen or a functional group having a relatively small number of carbon atoms, it may be more advantageous in terms of flexibility and compatibility with polyketone. When it is a functional group having a relatively large number of carbon atoms, it may be advantageous in terms of mechanical properties such as the strength of the resin.

Moreover, in the polyalkylene carbonate, the degree of polymerization (m) of the repeating unit represented by Chemical Formula 1 above may be about 10 to about 1000.

As described above, the polyalkylene carbonate has biodegradability together with excellent transparency, flexibility, oxygen barrier property, and mechanical properties as described above, but there are drawbacks in that due to its low thermal stability, when processed into pellets or films, decomposition easily occurs and the processing temperature range is very narrow.

The present inventors found that the thermal stability of the polyalkylene carbonate resin can be remarkably improved by mixing and using polyketone with polyalkylene carbonate, thereby completing the present invention.

The low thermal stability of the polyalkylene carbonate is basically caused by a phenomenon where a backbiting reaction occurs successively, in which, while hydrogen bonded to the hydroxy group at the terminal of the resin is eliminated under high temperature conditions, the terminal of the resin becomes an anion, which attacks a carbonate group in the nearest polymer chain, thereby shortening the length of the polymer chain while making a monomolecule such as alkylene carbonate.

Therefore, in order to suppress this phenomenon and improve the thermal stability, a substance which is excellent in compatibility with polyalkylene carbonate and can also effectively suppress the backbiting reaction is required.

In this case, a polymer resin is more advantageous than a substance in the form of a monomolecular, particularly, one having a low melting point. The reason for this is that it can be put in the form of a pellet into processing equipment at the time of processing, and kneading can be conducted during processing without requiring additional kneading (mixing) equipment. In addition, in the case of a monomolecular substance, a problem of migration to the surface of the product occurs when a certain period of time passes after processing. In the case of a polymer resin, such a phenomenon hardly occurs, which is thus advantageous.

In the case of polyketone, its molecular structure is similar to polyalkylene carbonate and so compatibility between resins is very high. If there is a polyketone chain around the polyalkylene carbonate polymer chain, oxygen in the anionic state at the terminal of the polyalkylene carbonate attacks hydrogen in the polyketone chain rather than a central carbon of the polyalkylene carbonate, thereby effectively suppressing the above-mentioned backbiting reaction, and ultimately improving the thermal stability of the polyalkylene carbonate.

The polyketone may include a repeating unit represented by the following Chemical Formula 2.

[Chemical Formula 2]

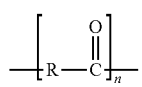

In Chemical Formula 2,

R is a linear or branched alkylene having 1 to 10 carbon atoms; an arylene having 1 to 10 carbon atoms; an alkylether having 1 to 10 carbon atoms; an arylether having 1 to 10 carbon atoms; an alkylester having 1 to 10 carbon atoms; or an arylester having 1 to 10 carbon atoms, and n is an integer of 10 to 1000.

The polyketone polymer having the structure as described above is produced by the reaction of carbon monoxide and a compound containing an unsaturated double bond. Recently, there has been an increasing interest in alternating copolymers in which repeating units composed of carbon monoxide and one or more ethylenically unsaturated hydrocarbons are alternately connected.

While processing the polyalkylene carbonate resin composition according to the above-described principle, the polyketone resin can effectively prevent a phenomenon where the polyalkylene carbonate is decomposed by heat at a high temperature, and allows processing at a high temperature and exhibits excellent processability.

Specifically, the polyalkylene carbonate resin composition according to one embodiment of the present invention may contain 1 part by weight or more, more preferably about 5 parts by weight or about 10 parts by weight or more, of polyketone based on 100 parts by weight of polyalkylene carbonate for achieving the above-mentioned effects. Within a range that does not impair the inherent chemical and physical properties of the polyalkylene carbonate resin, the polyalkylene carbonate resin composition may contain 60 parts by weight or less, more preferably about 50 parts by weight, or about 30 parts by weight or less, of polyketone based on 100 parts by weight of polyalkylene carbonate.

When the polyketone is used in an amount of less than the above range, there may be a problem that the above-described effects of the present invention, which can enhance the high temperature stability of the polyalkylene carbonate, cannot reach expectations. When the polyketone is used in an excessively large amount, it may be difficult to express the inherent physical and chemical properties of the alkylene carbonate.

According to one embodiment of the invention, the polyketone may preferably be an aliphatic polyketone containing ethylene, propylene, isopropylene, or butylene units.

According to one embodiment of the present invention, the polyketone may more preferably be a binary copolymer or a ternary copolymer. Specifically, an aliphatic polyketone form of a binary copolymer or a ternary copolymer containing at least one of an ethylene repeating unit, a propylene repeating unit, an isopropylene repeating unit, and a butylene repeating unit can be used.

The polyketone may have a weight average molecular weight of about 10,000 to about 1,000,000 g/mol.

According to another embodiment of the present invention, the polyalkylene carbonate resin composition may further contain about 1 to about 30 parts by weight of polylactide based on 100 parts by weight of the polyalkylene carbonate. When the polylactide is mixed and used, the thermal stability of the polyalkylene carbonate can be primarily improved, and consequently kneading with polyketone at a higher temperature can be carried out more stably. When the polylactide is contained in an excessively smaller amount than the above range, decomposition of the polyalkylene carbonate may occur at the time of kneading polyketone and polyalkylene carbonate at a high temperature. When the polylactide is contained in an excessively larger amount than the above range, there may be a problem that the inherent physical properties of the polyalkylene carbonate are deteriorated.

Generally, lactides may be classified into L-lactide composed of L-lactic acid, D-lactide composed of D-lactic acid, and meso-lactide composed of one L-form and one D-form. Further, a mixture of L-lactide and D-lactide in a ratio of 50:50 is referred to as D,L-lactide or rac-lactide. It is known that, when polymerization is carried out by using only L-lactide or D-lactide having high optical purity, among these lactides, L- or D-polylactide (PLLA or PDLA) having high stereoregularity is obtained, and that such polylactide is rapidly crystallized and has high crystallinity compared to a polylactide having low optical purity. However, in the present specification, "lactide monomers" is defined as including all types of lactides regardless of the difference in characteristics of lactides according to the types thereof and the difference in characteristics of polylactides formed therefrom.

The molecular structure of the polylactide may be that polymerized from L-lactic acid, D-lactic acid, or L,D-lactic acid. The polylactide may be prepared by a process including the step of forming the repeating units described below by ring-opening polymerization of lactide monomers. The polymer obtained after the completion of the ring-opening polymerization and the repeating unit formation process may be referred to as the polylactide. In this case, the category of lactide monomers may include all types of lactides as described above.

According to one embodiment of the present invention, the polylactide may have a degree of polymerization of preferably about 50 to about 500, and may have a weight average molecular weight of about 10,000 to about 1,000,000 g/mol. As the polylactide has the above-described degree of polymerization and weight average molecular weight, the polyalkylene carbonate resin composition may maintain the inherent physical properties of the polyalkylene carbonate, and obtain excellent thermal stability effect even during processing at a high temperature.

The category of the polymer that can be referred to as "polylactide" may include all the polymers obtained after the completion of the ring-opening polymerization and the repeating unit formation process, for example, unpurified or purified polymers obtained after the completion of the ring-opening polymerization, polymers included in a liquid or solid resin composition before the formation of a product, polymers included in plastic or textile after the formation of a product, and the like.

As methods of preparing a polylactide, a method of directly polycondensing lactic acid and a method of ring-opening polymerizing lactide monomers in the presence of an organic metal catalyst are known. The method of ring-opening polymerizing lactide monomers is complicated and is expensive compared to the polycondensation because lactide monomers must first be prepared from lactic acid, but a polylactide resin having a relatively large molecular weight can be easily obtained by the ring-opening polymerization of lactide monomers using an organic metal catalyst, and the polymerization rate thereof can be easily adjusted. Therefore, this method is commercially widely available.

The resin composition of the present invention contains polyalkylene carbonate, polyketone, and polylactide in a specific ratio, and thus has excellent transparency, flexibility, oxygen barrier properties, mechanical properties, and biodegradability, and also has little blocking phenomena between resins or products during processing, and has excellent thermal stability. Therefore, the resin composition can be suitably used not only for disposable articles such as shopping bags and packaging films, but also for semipermanent applications such as barrier multilayer films, multilayer sheets, floor materials, electronic product packages, and automobile interior materials.

Due to such a composition, the polyalkylene carbonate resin composition of the present invention may have a rate of mass loss due to thermal decomposition at about 250° C. of about 10% or less when measuring the rate of mass loss due to a temperature change.

More specifically, when measuring a rate of mass loss according to a temperature change using a thermogravimetric analysis (TGA) instrument, the polyalkylene carbonate resin composition may have a rate of mass loss due to thermal decomposition at about 250° C. of about 10% or less, and preferably about 1 to 5%. More preferably, it is possible to have a very low numerical value in which thermal decomposition does not occur at the above temperature and so the mass loss is 0.5% or less. Further, even at a temperature of about 300° C., the polyalkylene carbonate resin composition may have a rate of mass loss due to thermal decomposition of about 20% or less, preferably about 1 to 10%, and can have excellent thermal stability, and consequently the processability at high temperature can be excellent.

Various kinds of additives may be added to the alkylene carbonate resin composition of the present invention according for the use thereof. Examples of the additives may include, but are not limited to, additives for modification, colorants (pigment, dye, etc.), fillers (carbon black, titanium oxide, talc, calcium carbonate, clay, etc.), and the like. Examples of the additives for modification may include a dispersant, a lubricant, a plasticizer, a flame retardant, an antioxidant, an antistatic agent, a light stabilizer, an ultraviolet absorber, a crystallization promoter, and the like. These various kinds of additives may also be added when preparing a pellet from the polyalkylene carbonate resin composition or when forming the pellet to prepare a molded article.

As the method for preparing the polyketone resin composition of the present invention, various known methods can be used. As the method for obtaining a uniform mixture, for example, a method of adding the above-mentioned polyalkylene carbonate, polyketone, and polylactide at a constant ratio, and mixing them with a Henzel mixer, a ribbon blender, a blender, or the like can be mentioned.

As the melt kneading method, a VAN Antonie Louis Barye mixer, a single-screw compressor, a twin-screw compressor, or the like can be used. The shape of the resin composition of the present invention is not particularly limited, and for example, the shape thereof may be those that can be processed into a compound in a fluid state where the mixture is melted, a strand, a sheet, a flat film, a pellet, or the like.

According to another aspect of the present invention, a polyalkylene carbonate resin molded article which is produced using the above-described polyalkylene carbonate resin composition is provided.

These molded articles may include a film, a film laminate, a sheet, a filament, a nonwoven fabric, an injection molded article, and the like.

The methods of obtaining a molded article by forming the polyalkylene carbonate resin composition of the present invention may include, for example, injection molding, compression molding, injection-compression molding, gas injection molding, foam injection molding, inflation, a T-die method, a calendar method, blow molding, vacuum molding, extrusion molding, and the like. In addition, a processing method that is generally used in the technical field to which the present invention belongs can be used without particular limitation.

Hereinafter, the function and effect of the present invention will be described in more detail by way of specific examples of the invention. However, these examples are set forth to illustrate the invention, and the scope of the invention is not limited thereto.

EXAMPLE

Preparation of Polyethylene Carbonate Resin

A polyethylene carbonate resin was prepared by copolymerizing ethylene oxide and carbon dioxide using a diethylzinc catalyst through the following method (Journal of Polymer Science B 1969, 7, 287; Journal of Controlled release 1997, 49, 263).

1 g of a dry diethyl-zinc catalyst and 10 mL of a dioxane solvent were introduced into an autoclave reactor equipped with a stirrer, and then 0.1 g of diluted purified water was added to 5 ml of the dioxane solvent while stirring slowly. Subsequently, carbon dioxide was charged in the reactor to a pressure of about 10 atm, and then the solution was stirred at 120° C. for 1 hour. Then, 10 g of purified ethylene oxide was added, carbon dioxide was again charged to a pressure of about 50 atm, and then the temperature was adjusted to 60° C. and the reaction was performed for about 48 hours. After the reaction, unreacted ethylene oxide was removed under low pressure, and the reaction product was dissolved in a dichloromethane solvent. Then, the dissolved reaction product was washed with an aqueous hydrochloric acid solution (0.1 M), and then precipitated with a methanol solvent to obtain a polyethylene carbonate resin. The amount of the obtained resin was about 15 g, the formation thereof was observed by nuclear magnetic resonance spectroscopy, and it was confirmed that the weight average molecular weight thereof analyzed by gel permeation chromatography (GPC) was 174,000 g/mol.

Preparation of Polylactide Blended Pellets

Polylactide (NatureWorks PLA 3001D) was mixed with the polyethylene carbonate prepared above to prepare pellets so that the polylactide content was 5 wt %.

Example 1

450 g of polyethylene carbonate (weight average molecular weight: 174,000 g/mol, containing 5 wt % of NatureWorks PLA 3001D) pellets and 50 g of polyketone (Hyosung, M620A) pellets were dry-blended at room temperature.

The resin composition thus obtained was prepared in the form of a 100 μm-thick film using a twin screw extruder (BA-19, BAUTECH) to which T-die was fastened.

Example 2

350 g of polyethylene carbonate (weight average molecular weight: 174,000 g/mol, containing 5 wt % of NatureWorks PLA 3001D) pellets and 150 g of polyketone (Hyosung, M620A) pellets were dry-blended at room temperature.

The resin composition thus obtained was prepared in the form of a 100 μm-thick film using a twin screw extruder (BA-19, BAUTECH) to which a T-die was fastened.

Example 3

250 g of polyethylene carbonate (weight average molecular weight: 174,000 g/mol, containing 5 wt % of NatureWorks PLA 3001D) pellets and 250 g of polyketone (Hyosung, M620A) pellets were dry-blended at room temperature.

The resin composition thus obtained was prepared in the form of a 100 μm-thick film using a twin screw extruder (BA-19, BAUTECH) to which a T-die was fastened.

Comparative Example 1

500 g of polyethylene carbonate (weight average molecular weight: 174,000 g/mol, containing 5 wt % of NatureWorks PLA 3001D) was used alone and prepared in the form of a 100 μm-thick film using a twin screw extruder (BA-19, BAUTECH) to which a T-die was fastened.

Experimental Example

For the film-like resins prepared in the examples and comparative examples, the rate of mass loss due to temperature change was measured using a TGA analyzer. At the time of TGA analysis, the measurement was carried out while increasing the temperature from room temperature to 550° C. at a rate of about 10° C./min under a nitrogen atmosphere. The results are shown in the graph of the Drawing.

Referring to the Drawing, in the case of Comparative Example 1 in which only polyethylene carbonate (containing 5% of polylactide) was used alone, it can be confirmed that thermal decomposition starts from a temperature of about 180° C., and that a half decomposition temperature (half-loss) is about 270° C., which is very fragile under high temperature conditions.

However, in the case of the examples of the present invention including the polyketone, it can be clearly confirmed that no thermal decomposition occurs at all even at a temperature of about 250° C., and that the thermal decomposition partially occurs as the temperature rises to about 270° C. or more, but the mass loss is less than about 20% even at a temperature of about 300° C. or more (in the absence of polyketone, the mass loss at about 300° C. is 90% or more), the half decomposition temperature is about 320° C. or more, which is about 50° C. higher than that of the comparative examples, and thus the stability against heat is very high.

Accordingly, it can be confirmed that the polyalkylene carbonate resin composition according to the examples of the present invention has high thermal stability. In particular, it can be inferred that excellent processability and thermal stability can be obtained even under high temperature processing conditions, such as molding of a multilayer film or multi-layer sheet by co-extrusion, etc.

The invention claimed is:

1. A polyalkylene carbonate resin composition comprising:
    100 parts by weight of polyalkylene carbonate; and
    1 to 100 parts by weight of polyketone,
        wherein the polyalkylene carbonate is at least one selected from the group consisting of polyethylene carbonate, polypropylene carbonate, polypentene carbonate, polyhexene carbonate, polyoctene carbonate, polycyclohexene carbonate, and a copolymer thereof.
2. The polyalkylene carbonate resin composition according to claim 1, wherein the polyalkylene carbonate has a weight average molecular weight of 10,000 g/mol to 1,000,000 g/mol.
3. The polyalkylene carbonate resin composition according to claim 1, wherein the polyketone includes a repeating unit represented by Chemical Formula 2:

[Chemical Formula 2]

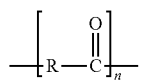

wherein, in Chemical Formula 2,

R is a linear or branched alkylene having 1 to 10 carbon atoms, an arylene having 1 to 10 carbon atoms, an alkyl ether having 1 to 10 carbon atoms, an aryl ether having 1 to 10 carbon atoms, an alkyl ester having 1 to 10 carbon atoms, or an aryl ester having 1 to 10 carbon atoms, and n is an integer of 10 to 1000.

4. The polyalkylene carbonate resin composition according to claim 1, wherein the polyketone is an aliphatic polyketone containing ethylene, propylene, isopropylene, or butylene units.

5. The polyalkylene carbonate resin composition according to claim 1, wherein the polyketone is a binary copolymer or a ternary copolymer.

6. The polyalkylene carbonate resin composition according to claim 1, wherein the polyketone has a weight average molecular weight of 10,000 to 1,000,000 g/mol.

7. The polyalkylene carbonate resin composition according to claim 1, further comprising 1 to 30 parts by weight of polylactide based on 100 parts by weight of the polyalkylene carbonate.

8. The polyalkylene carbonate resin composition according to claim 1, wherein, when measuring a rate of mass loss due to a temperature change, the rate of mass loss due to thermal decomposition at 250° C. is 10% or less.

9. A polyalkylene carbonate resin molded article which is produced using the polyalkylene carbonate resin composition of claim 1.

10. A polyalkylene carbonate resin composition comprising:

polyalkylene carbonate;

polylactide; and polyketone, wherein the polyketone is included in an amount of 1 to 100 parts by weight relative to 100 parts by weight of a mixture of the polyalkylene carbonate and the polylactide, wherein the polylactide is included in an amount of 1 to 30 parts by weight relative to 100 parts by weight of the polyalkylene carbonate, and wherein the polyalkylene carbonate is at least one selected from the group consisting of polyethylene carbonate, polypropylene carbonate, polypentene carbonate, polyhexene carbonate, polyoctene carbonate, polycyclohexene carbonate, and a copolymer thereof.

* * * * *